United States Patent [19]

Gross et al.

[11] 4,448,753
[45] May 15, 1984

[54] APPARATUS FOR REGENERATING CRACKING CATALYST

[75] Inventors: Benjamin Gross, Cherry Hill; James H. Haddad, Princeton Junction; Madhava Malladi, West Deptford, all of N.J.

[73] Assignee: Mobil Oil Corporation, New York, N.Y.

[21] Appl. No.: 348,484

[22] Filed: Feb. 12, 1982

[51] Int. Cl.³ ............................. B01J 8/26; B01J 11/18
[52] U.S. Cl. ................................... 422/144; 422/145; 208/164; 208/113
[58] Field of Search ...................... 422/144, 145, 147; 208/164, 153, 113

[56] References Cited

U.S. PATENT DOCUMENTS

| | | | |
|---|---|---|---|
| 2,378,607 | 6/1945 | Watts | 422/144 |
| 2,439,582 | 4/1948 | Scheineman | 208/164 X |
| 2,901,331 | 8/1959 | Heid et al. | 422/147 X |
| 3,338,821 | 8/1967 | Moyer et al. | 208/113 |
| 3,812,029 | 5/1974 | Snyder, Jr. | 208/113 |
| 3,821,103 | 6/1974 | Owen et al. | 208/153 X |
| 3,898,050 | 8/1975 | Strother | 422/144 |
| 4,035,284 | 7/1977 | Gross et al. | 422/144 X |
| 4,093,537 | 6/1978 | Gross et al. | 208/164 |
| 4,118,337 | 10/1978 | Gross et al. | 252/417 |
| 4,118,338 | 10/1978 | Gross et al. | 252/417 |
| 4,197,189 | 4/1980 | Thompson et al. | 422/144 X |
| 4,218,306 | 8/1980 | Gross et al. | 208/120 |
| 4,283,273 | 8/1981 | Owen | 422/144 X |

*Primary Examiner*—Delbert E. Gantz
*Assistant Examiner*—Glenn A. Caldarola
*Attorney, Agent, or Firm*—Alexander J. McKillop; Michael G. Gilman; Stanislaus Aksman

[57] ABSTRACT

A fast fluidized bed regenerator of an FCC apparatus is improved by incorporating into the regenerator an internal riser, for more complete combustion of coke, and by providing a means of preventing catalyst flow reversals between the spent and regenerated beds of the catalyst.

9 Claims, 3 Drawing Figures

APPARATUS FOR REGENERATING CRACKING CATALYST

BACKGROUND OF THE INVENTION

1. Field of the Invention

This invention relates to an improved method and apparatus for regenerating a cracking catalyst. More particularly, this invention relates to an improved fluid catalytic regenerator design and the method of operation thereof.

2. Discussion of the Prior Art

In recent years the design and operation of fluid cracking operations with and adjacent catalyst regeneration system has gone through some unusual design transitions with a view to improving the efficiency of the combination operation as well as the product distribution obtained from such an operation. In particular, the designs have been concerned with utilizing fluid crystalline aluminosilicate cracking catalysts in volume to oil feed ratios which minimize the catalyst inventory of the operation, improve product selectivity, and improve the recovery of available heat generated in the catalyst regeneration system. Catalyst regeneration has been improved by increasing the catalyst bed regeneration temperature by the recycle of hot regenerated catalyst thereto and by particularly promoting the combustion of CO to $CO_2$ therein by thermal and catalytic effects. That is, some recent design changes incorporate recycling by external pipe means of hot regenerated catalyst for admixture with cooler spent catalyst recovered from the hydrocarbon conversion operation such that the combined temperature of the mixed catalyst streams is sufficiently high to rapidly initiate coke burning and accomplish catalytic CO (carbon monoxide) burning in a substantial portion of a dense fluid bed of catalyst being regenerated. It has been found in some regeneration operations that the CO concentration in the flue gas exceeds emission standards and unburned residual carbon on regenerated catalyst becomes undesirably high; that is, above about 0.05%. Several design parameters and apparatus arrangements have been proposed to solve this problem. However, these designs often suffer from a number of problems such as high catalyst inventory, low temperature, incompletely regenerated catalyst, a lack of operating flexibility to control catalyst recycle, or employ external apparatus configurations or arrangements in an effort to effect more suitable control in the operation, thereby contributing to costs.

Some regenerator vessel designs and arrangements have been substatially increased in height, thereby increasing construction costs. In these arrangements, the circulating catalyst inventory and necessary catalyst bed hold-ups have increased and high temperature metallurgy requirements have increased. These factors contribute to increased material, maintenance and operating costs of the units. Additional operating details of these and other prior art FCC units can be found in: U.S. Pat. Nos. 2,383,636 (Wurth); 2,689,210 (Leffer); 3,338,821 (Moyer et al.); 3,812,029 (Synder, Jr.); 4,093,537 (Gross et al.); 4,118,338 (Gross et al.); and 4,218,306 (Gross et al.) as well as in Venuto et al., *Fluid Catalytic Cracking with Zeolite Catalysts*, Marcel Dekker, Inc. (1979). The entire contents of all of the above patents and publications are incorporated herin by reference.

In some recent designs, flexibility of FCC regenerators is improved by providing a means of recycling at least a portion of the regenerated hot catalyst into a bed of spent catalyst (Gross et al., U.S. Pat. No. 4,118,338). The recycle is accomplished by providing two concentric fluidized catalyst beds in the regenerator. The inner bed contains spent catalyst and the outer bed regenerated catalyst. The amount of the regenerated catalyst recycled into the inner bed is controlled by the pressure differential between the upflowing inner bed and the downflowing outer catalyst bed. This improved regenerator design increases flexibility of the FCC installation, allows for high catalyst recirculation ratios and substantially decreases the total inventory of the catalyst necessary for carrying out the process. However, this design, under certain operating conditions, also makes it possible for the respective catalyst beds to reverse their intended direction of flow. In addition, under some operating conditions, the regenerated catalyst may have more residual coke left thereon than might be desired.

BRIEF DESCRIPTION OF THE INVENTION

In accordance with the present invention, there is provided a fast fluidized bed FCC regenerator containing a means for internally recirculating regenerated catalyst while preventing catalyst flow reversals, and a means for producing a very clean catalyst with a minimum of residual coke. The FCC regenerator of this invention contains a short riser to produce a very clean catalyst with a minimum of inventory. Potential catalyst flow reversals are eliminated by providing a trickle valve means preventing the flow reversal of the catalyst from the spent catalyst bed to the regenerated bed.

DETAILED DESCRIPTION OF THE INVENTION

Figure 1:
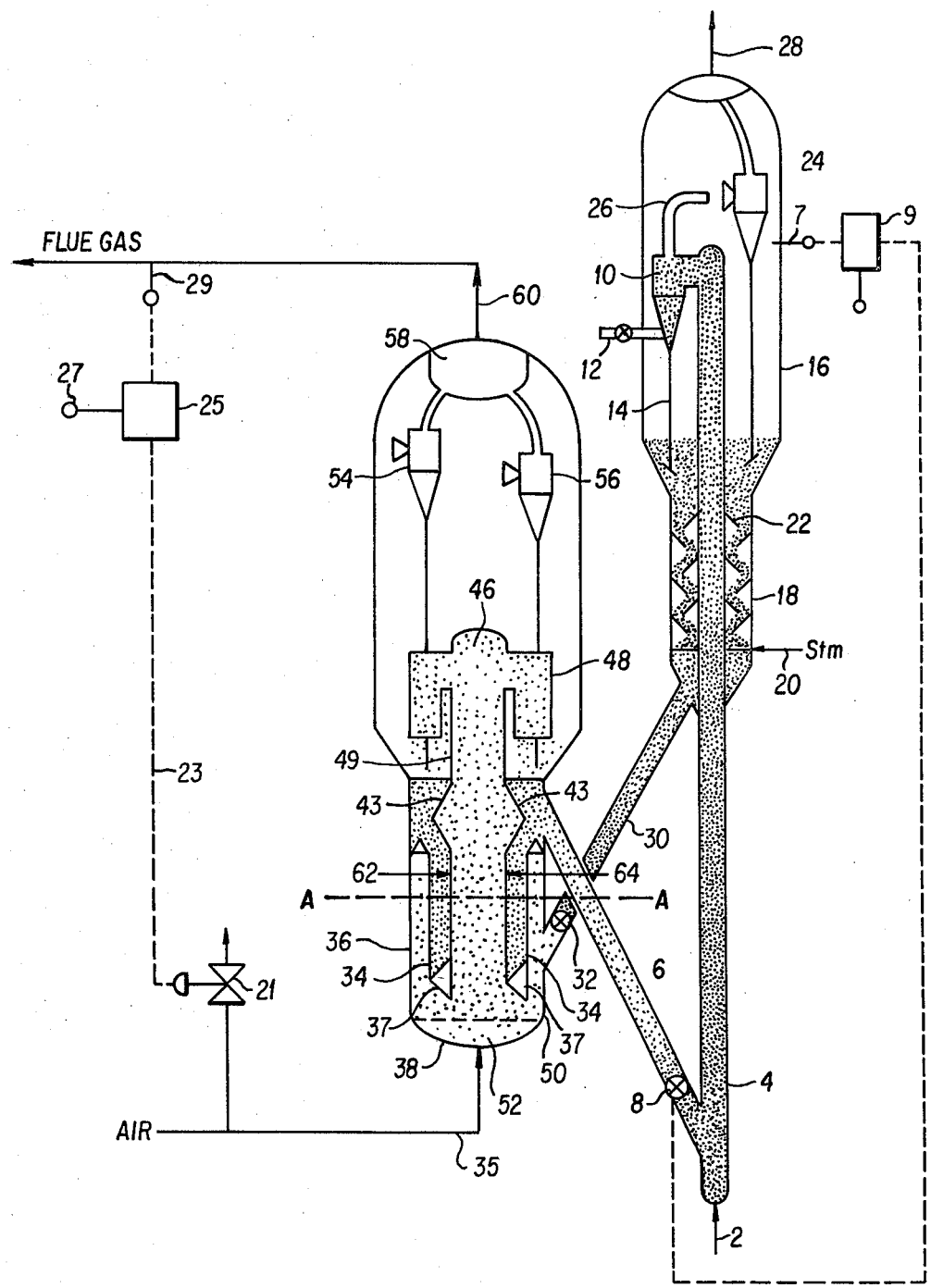
FIG. 1 is a diagrammatical sketch in elevation of one embodiment of the invention using a series of internal pipe means, equipped with a trickle valve means, for recycling the regenerated catalyst.

The regenerator apparatus in one embodiment of this invention comprises a cylindrical chamber generally restricted in size to house an upflowing fluid mass of catalyst which is surrounded by a larger diameter vessel of a sufficient diameter to provide an annular second space housing a mass of downflowing catalyst in the annular space or chamber about said cylindrical chamber. The annualr second space or chamber houses a second substantially more dense fluid mass of downflowing catalyst particles than that housed in said upflowing cylindrical chamber.

Communication between the cylindrical chamber and the annular space is provided by a series of trickle valves in the cylindrical wall defining the inner cylindrical chamber. The trickle valves in this embodiment allow a portion of the regenerated catalyst to be recycled into the cylindrical chamber, but prevent the flow of the regenerating gas and of the spent catalyst from the cylindrical chamber into the annular second space or chamber. Spent catalyst particles are transferred from the reactor vessel to the cylindrical chamber in the regenerator vessel by a conduit equipped with a conventional valve means.

In a preferred embodiment, means for recirculating regenerated catalyst is provided by one or more pipe means which communicate at their lower end with the cylindrical chamber. Each of these pipes has a trickle valve which allows a portion of the regenerated catalyst to be recycled into the cylindrical chamber, but which prevents the flow of the regenerating gas and of the spent catalyst from the inner cylindrical chamber to the pipe means. The exact number, configuration and size of pipe means depends on the amount of catalyst to be recycled and on the operational characteristics of each particular installation, as will be apparent to those skilled in the art. The mixture of spent and regenerated catalyst is transferred upwardly through the cylindrical chamber by an oxygen-containing gas stream introduced through an opening at the bottom of the regenerator. A horizontally placed small circular baffle means is placed in the bottom portion of said cylindrical chamber in coaxial alignment with said bottom opening thereto and spaced vertically apart therefrom and from the discharge open end of said opening to aid with distributing the regenertion gas across the lower cross-sectional area of the cylindrical chamber. A perforated distributor grid may be placed across the bottom portion of said cylindrical chamber above said circular baffle means, or in lieu thereof, to further distribute the upflowing regeneration gas, as discussed below.

A fluid mass of upflowing catalyst particles of relatively high particle concentration undergoes regeneration by burning deposited carbonaceous material on the catalyst particles to form carbon monoxide in the presence of oxygen containing gas. All of the oxygen containing regeneration gas required in the regenerator is usually introduced at the bottom of the regenerator. The horizontal perforated grid means in the bottom portion of the cylindrical chamber may be used alone or in conjunction with the baffle means described above. In the preferred embodiment, the spent catalyst in introduced directly through the side wall into the lower end of the cylindrical chamber, just downstream of the perforated grid means. The perforated grid means thus comprises an air distributing grid for distributing oxygen containing regeneration gas.

In an alternative catalyst-regenerating gas mixing arrangement, the means for recirculating regenerated catalyst is provided as described above for the two embodiments. However, in this alternative arrangement the regenerating gas and the spent catalyst are mixed in a vertical pipe below the cylindrical chamber and the regenerating gas lifts the spent solids as a suspension into the bottom of the cylindrical chamber through a distribution means.

In any of these regeneration gas inlet arrangements, the volume of gas and velocity relied upon will be sufficient to maintain an upflowing suspension providing a concentration of catalyst particles within the range of about 5 to about 40 lbs per cubic foot and more usually less than 35 lbs per cubic foot.

After passing through the cylindrical chamber, the fluidized bed of catalyst is conducted into a relatively short riser, having a length of about 1–30 feet, preferably about 15–20 feet, placed directly above the cylindrical chamber, wherein additional burning of the coke deposited on the catalyst particles takes place. The top of the riser is capped by a member housing a catalyst phase of lower density than that in the cylindrical chamber below. Below said member the top of the riser is equipped with one or more radially extending inverted "U" shaped arm means, open on the bottom side thereof for changing the direction of flow of the suspension and promoting the separation of entrained hot regenerated catalyst particles from gaseous combustion products. The outer ends of said radiating arms curve or extend downwardly and are in open communication at their extreme ends with said annular chamber section about said cylindrical chamber, or top ends of pipe means within said chamber.

A relatively dense, downwardly moving fluid bed of catalyst particles of higher particle concentration than said upflowing mass of catalyst in the cylindrical chamber is maintained in the pipe means, of the preferred embodiment, or in said annular chamber section, of the alternative embodiment. The height of this downwardly moving fluid catalyst bed is sufficient to develop a catalyst pressure head therein to effect recycle of regenerated catalyst particles as desired from the pipe means, or from the bottom opening of said annular chamber, into the bottom opening of said cylindrical chamber. Thus, the amount of catalyst recycled and admixed with the spent catalyst suspension discharged into the bottom regenerator opening may be controlled by the pressure differential between the upflowing and downflowing catalyst masses, i.e., the developed catalyst pressure head by the downflowing dense fluid bed of catalyst above that in the upflowing mass. The pressure developed by the catalyst in the pipe means or in the annular section may be controlled substantially by the head of catalyst contained therein and/or by the amount of gaseous material introduced to the annular section or the pipe means. Thus, the more the catalyst in the annulus or in the pipe means is fluffed or fluidized with fluidizing gas, the less pressure head it will develop. The gaseous material introduced to the annulus or pipe means may be a regeneration gas, such as air, to effect a secondary high temperature burning of any residual carbon on catalyst, or an inert gas for fluffing and/or stripping the catalyst may be employed. In either arrangement, the volume of gas introduced may be used to control the pressure head developed by the recirculating bed of catalyst.

In the preferred embodiment using pipe means for recycling a portion of the regenerated catalyst into the cylindrical chamber, the pipes are sized to accommodate the desired recirculation rate. In the alternative embodiment incorporating the trickle valve means in the cylindrical wall, the annulus of the regenerator is sized to accommmodate the desired recirculation rate.

The internal catalyst recycle rate in the pipe means or in the annular section of the fast fluidized bed regenerator can be controlled by varying the regeneration gas velocity in the dense fluid bed contained in the combustor. Higher regeneration gas velocities entrain more catalyst into the upper regeneration vessel, thus increasing the catalyst flow rate through the annular section or the pipe means, which in turn increases the regenerated catalyst flow into the regenerator combustor. The annular space or pipe means and the combustor bed form two communicating beds which are always in pressure balance. Since the catalyst bed levels are always in equilibrium, the recirculation rate can be maintained constant for a given regeneration gas velocity and fixed total catalyst inventory in the regenerator.

Similarly, the regenerated catalyst recirculation rate can be reduced by decreasing the regeneration gas velocity in the combustor dense bed. The effect of two different catalyst recirculation rates on regenerator performance was evaluated and the results are summarized in Table 1, below. In the event of a reduction in the reactor feed rate, the regenerator operation can be controlled by decreasing both the regenerator catalyst inventory and the dense bed velocity.

TABLE 1

| REGENERATOR PERFORMANCE | | |
|---|---|---|
| Cat. Recycle Ratio (Recirculated/Spent) | 10.0 | 3.0 |
| Av. Density, Combustor (Comb.), Lb/Ft$^3$ | 18.0 | 17.0 |
| Cat. Holdup, Comb., Tons | 36.0 | 38.0 |
| Total Cat. Holdup, Tons | 65.0 | 54.0 |
| Regenerator ΔP, PSI | 6.0 | 4.5 |
| Dense Bed (D.B.) Temp., °F. | 1270 | 1268 |
| Max. Outlet Temp., °F. | 1316 | 1322 |
| Carbon on Regen., Wt. % | 0.066 | 0.067 |
| Flue Gas O$_2$, Vol. % | 2.10 | 1.40 |
| Gas Velocity, D.B., Ft/Sec | 7.20 | 5.90 |

An alternative method for controlling the head of catalyst within the pipe means or the annular section, and without the use of gaseous material introduced into the pipe means or the annular section, comprises providing the inlet ends of the pipe means or of the annular section with weirs, and controlling the inventory and therefore the level of catalyst in the upper regenerator vessel above the base of the weirs. The higher the level of catalyst above the base of the weirs, the higher the rate of catalyst flow through the weirs into the pipe means or into the annular section. The increase in flow rate would increase the head of catalyst within the pipe means or the annular section, and would result in a corresponding increase in flow rate out of the pipe means or the annular section into the cylindrical vessel.

The regenerator apparatus of this invention eliminates the necessity for a slide valve used in the prior art regenerators with external recycling means and decreases the total amount of catalyst inventory required in the process, both of which factors reduce operating costs. In addition, the recirculation rate of the regenerated catalyst can be accurately and easily controlled, thereby facilitating precise control of the entire FCC installation and increasing flexibility of operating conditions thereof. The provision of a short riser within the regenerator vessel, in addition to improving the regeneration process, also decreases the overall height of the unit, resulting in further cost reductions.

The trickle valve means, used in both the preferred embodiment with the pipe means and in the alternative embodiment with the annulus, is of a conventional design, known to those skilled in the art. Such valve means permits the passage of the catalyst, in response to the predetermined pressure exerted thereon, in one desired direction, but prevents the passage of other materials (e.g., the regenerating gas and the spent catalyst) in the opposite direction. The trickle valve means is placed substantially vertically in the pipe means or in the wall of the annulus.

The apparatus arrangement described above is similar to the prior art apparatus arrangement of U.S. Pat. No. 4,118,338 in that a cylindrical regenerator vessel is sized to house primarily an upflowing fluid mass of catalyst particles providing a concentration of catalyst particles within the range of about 5 to about 40 pounds per cubic foot. A relatively dispersed catalyst phase will be maintained for a limited time in the restricted upper portion before entering the disengaging arms. Regenerated hot catalyst particles are introduced into the bottom of the upflowing catalyst mass at a temperature of 1250° to about 1600° F., preferably less than about 1450° F., and most preferably less than about 1350° F. The catalyst temperatures developed during regeneration in the cylindrical, upflowing fluid mass of catalyst particles are controlled in substantial measure as a function of regeneration gas flow rate and temperature, the amount of combustibles to be burned, the spent catalyst rate of flow, the temperature of the recycled catalyst mass, and the amount of catalyst recycled to the bottom inlet of the cylindrical chamber. The recirculation of regenerated catalyst from the downwardly flowing dense catalyst phase in the annulus or the pipe means to the upflowing less dense catalyst mass can be varied from a small fraction (about 0.1) to a high multiple of the catalyst flow (about 10). Thus, the upflowing cylindrical fluid catalyst mass is maintained at a relatively high superficial gas velocity (less than 10 ft/sec) since high rates of entrainment can be accommodated with separation and return of catalyst through the pipe means, of the preferred embodiment, or the annulus, of the alternative embodiment, to the upflowing bed. This system for effecting fluidized catalyst regeneration has greatly increased regeneration efficiency due to better mixing and more uniform temperatures in the catalyst mass. Preheating of regeneration air and addition of a combustible fuel in addition to carbonaceous deposits on the catalyst may also be relied upon to exercise some effect on the regeneration temperatures achieved in the system.

The vessel means extending above the cylindrical chamber section of the regenerator vessel is sized to house a plurality of cyclonic separating means comprising two or more sequentially arranged cyclones, whereby catalyst particles entrained with gaseous material recovered from the pipe means, the annular section and/or the cylindrical section are separated and returned by cyclone diplegs to the dense bed of catalyst therebelow.

The hydrocarbon conversion side of the apparatus combination is conventional in construction, and it comprises one or more conventional riser conversion reaction zones to which hot regenerated catalyst is supplied from the regenerator above described. An oil charge, such as gas oil or other high boiling material to be cracked, is charged to the riser with or without a gasiform diluent material. The diluent material may be light gaseous hydrocarbon comprising C$_5$ and lighter materials or it may be a relatively inert material such as steam. The diluent may be mixed with the oil charge before contact with the catalyst or it may be used to initially lift the catalyst up a portion of the riser conversion zone before contact with oil. The regenerated catalyst is mixed with the oil feed to be converted under conditions to form a suspension at an elevated temperature of at least 900° F, and more usually at a temperature within the range of 1000° F. to about 1150°F. Preheating of the hydrocarbon charge up to about 800° F. in combination with multiple nozzle feed inlet means across the riser cross-section to obtain a more completely dispersed catalyst-oil suspension and mix temperature may also be employed.

The suspension formed in the riser is passed upwardly through the riser at a velocity providing a hydrocarbon residence time within the range of 1 to 20 seconds, preferably within the range of 2 to 10 seconds, and most preferably less than about 8 seconds, depending on the characteristics of the oil charge to be cracked, the activity of the catalyst and temperature employed. Overcracking of the charge is to be avoided, particularly when desiring gasoline boiling range product. After suspension exits the riser cracker, it is discharged directly into one or more separator means connected generally radially to the discharge end of the riser. The separator means relied upon for separating the catalyst hydrocarbon suspension is any conventionally used separator means, e.g., the cyclone separator of U.S. Pat. No. 4,043,899, the entire contents of which are incorporated herein by reference, and comprising stripping means in the lower section of the cyclonic separator. The cyclonic-stripping separation combination is particularly desirable to minimize undersired over-cracking of desired product at the elevated cracking temperatures employed since it permits a greater control of the time the hydrocarbons are in contact with catalyst particles at the elevated temperatures. Rapid separation of at least a major portion of the catalyst from hydrocarbon product of cracking upon discharge from the riser is most important in order to preserve the selectivity of the catalyst employed under the operating conditions of the cracking operation.

The upper end of the hydrocarbon conversion riser with attached primary separating means, such as the preferred cyclonic separating means, is housed in a large cylindrical vessel having larger diameter in an upper portion thereof than in a lower portion thereof. The upper portion of this relatively large cylindrical vessel provides space for housing additional secondary cyclonic separating means for the further separation and recovery of catalyst fines from hydrocarbon vapors.

Catalyst particles separated from hydrocarbon vapors as above described are passed downwardly into and through a lower stripping section comprising the smaller diameter portion of the vessel wherein the catalyst is counter-currently contacted with additional stripping gas to further remove entrained hydrocarbons from the catalyst. The stripping zone may be a separate cylindrical chamber of suitable diameter or an annular section as shown in the drawings. The temperature of the stripping zone is usually at least 900° F. and may be as high as 1000° F. or 1150° F. Generally, it is 50° to 100° F. below the inlet cracking temperature. Thus, a stripping gas, such as steam or other suitable relatively inert stripping gas, should be at an appropriately elevated high temperature to minimize reducing the temperature of the discharged and separated catalyst before contact with oxygen containing gas in the regeneration zone.

In a time restricted regeneration mode, particularly desired in modern refinery operations, combustion of carbonaceous material with oxygen-containing gas is desirably initiated at a temperature of at least about 1100° F., and more preferably of at least about 1175° F. The two stage fluid catalyst mass regeneration arrangement of this invention, incorporating a relatively short riser, allows the regeneration operation to be carried out at such higher temperatures of about 1200 to about 1300° F. without a significant upset of the catalyst regeneration sequence. In any of the catalyst regeneration arrangements above identified, it is important to particularly promote the combusion of carbon monoxide formed in the regenerator atmosphere to recover the heat generated by the catalyst regeneration operation.

The apparatus configuration and method of operation of this invention is novel in several respects as herein discussed. The combination of apparatus is useful for cracking various hydrocarbon fractions including straight run gasoline and higher boiling materials, such as atmospheric and vacuum gas oils, recycle oils, residues, shale oils, solvent refined coal, and tar sands extraction products to produce products of improved octane rating. It is particularly useful for cracking gas oils and higher boiling hydrocarbon fractions such as recycle and residual oils, vacuum gas oils, wide boiling range crude oils, and hydrogenated resids to obtain desired products.

The catalysts which may be employed with advantage in the apparatus combination of this invention include amorphous and crystalline silica-alumina catalytic materials and mixtures thereof. The crystalline silica-alumina materials may be of a relatively large pore size, such as one may obtain by using faujasite crystalline zeolites, mordenite and other known materials disclosed in the prior art. The catalyst may be a mixture of large and smaller pore crystalline zeolites, such as disclosed in U.S. Pat. No. 3,748,251, the entire contents of which are incorporated herein by reference. On the other hand, the catalyst employed may be one o the catalysts disclosed in U.S.Pat. No. 3,886,060, the entire contents of which are incorporated herein by reference.

From the foregoing description of the invention, it is believed that one skilled in the art will be able to adopt it to various conditions and processes. Accordingly, the description of the following specific embodiments is presented herein for illustrative purposes only and is not to be considered as a limitation of the scope of the invention.

The invention will now be described in conjunction with the application thereof to two exemplary embodiments thereof, illustrated in FIGS. 1, 2 and 3.

Figure 2:
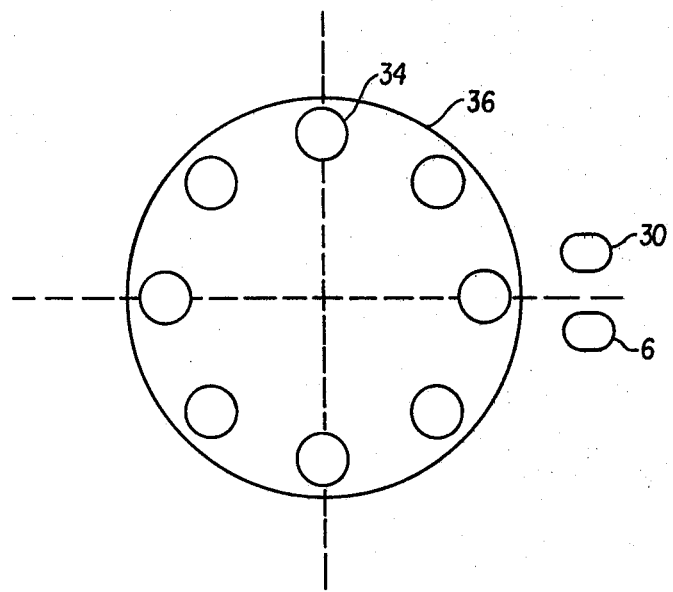
FIG.2 is a diagrammatical sketch of the Crossection A-A of the embodiment of FIG. 1.

FIG. 1 is a diagrammatical sketch in elevation of the preferred embodiment of the invention using a series of internal pipe means for recycling the regenerated catalyst. A hydrocarbon oil feed such as gas oil or higher boiling material is introduced by conduit 2 to the bottom of riser reactor 4. Hot regenerated catalyst is also introduced to the bottom of the riser 4 by a standpipe 6 containing a flow control valve 8. A solid-liquid-vapor suspension is formed in the lower portion of the riser 4 at an elevated temperature of above about 950° F., preferbly above about 980° F., and most preferably of about 980° to 1200° F., depending on the hydrocarbon conversion desired and the composition of the hydrocarbon material charged to the riser. The suspension formed in the riser base portion is passed through the riser under selected temperature and residence time conditions. The hydrocarbon residence time is in the range of 1 to 20 seconds, and preferably 2 to 10 seconds. In the arrangement of FIG. 1, the suspension is discharged from riser 4 into one or more cyclonic separators attached to the end of the riser and represented by separator means 10. Catalyst particles separated in cyclone 10 pass in contact with stripping gas introduced by conduit 12 to the lower portion of the cyclone. Catalyst thus contacted and separated is withdrawn by dipleg 14 for discharge into a bed of catalyst therebelow.

The upper end of riser 4 with attached separator means 10 as shown, or another suitable arrangement herein identified, is housed in a larger vessel means 16 herein referred to as a receiving and catalyst collecting vessel. The lower portion of vessel 16 is generally of smaller diameter and comprises a catalyst stripping section 18 to which a suitable stripping gas, such as steam, is introduced to a lower portion thereof, e.g., by conduit 20. The stripping section is provided with a plurality of baffle means 22 over which the downflowing catalyst passes counter-currently to upflowing stripping gas.

Cyclonic separating means 24 is provided for recovering hydorcarbon products and stripping gas from entrained catalyst particles. There may also be a second sequential stage of catalyst separation, not shown for clarity, for product vapors discharged from cyclone 10 by conduit 26. Hydrocarbon products and stripping gas separated from the catalyst are withdrawn by suitable conduit means communicating with a plenum chamber and withdrawl conduit 28.

Stripped catalyst comprising carbonaceous deposits of the riser conversion is withdrawn from the bottom of the stripping section at an elevated temperature by standpipe or conduit 30 containing flow control valve 32. The stripped catalyst is passed from standpipe 30 into the bottom portion of the regenerator vessel 36. A regeneration gas is also introduced to the bottom of the regenerator by conduit 35. The regeneration gas is either preheated air or any other oxygen-containing gas. The regeneration gas is introduced in an amount forming a suspension with the catalyst which is caused to move upwardly through the vessel 36. Regenerator vessel 36 comprises a bottom closure member 38 shown in the drawing to be half-rounded in shape. Other suitable shapes may also be employed, such as conical or a less rounded dish shape.

A series of pipe means 34 (also shown in cross-section in FIG. 2), comprising at least one, preferably two, and as many as eight or more pipes, provides communication between the chamber 36 and the outlet of arms 48, discussed below. Each of the pipe means 34 is equipped with a trickle valve means 37 which allows for the recycle of regenerated catalyst into the chamber 36, but prevents the flow of the spent catalyst and the regeneration gas from chamber 36 into pipes 34. Vessel 36 is provided with a generally conical head member 43 terminating in a relatively short cylindrical section of a sufficient vertical height to accommodate a plurality of radiating arm means 48. The radiating arm means 48 is open in the bottom side thereof since they are "U" shaped channels in cross-section, and they operate to discharge a concentrated stream of catalyst substantially separated from combustion product gases generally downward into the open top ends of the pipe means 34. Vessel 36 is referred to herein as the combustor vessel, since in this portion of the regenerator the combustion of carbonaceous material and formed carbon monoxide is particularly promoted. A distributor grid 50 is preferably used in the lower cross-section of the vessel 36 above bottom 38 to facilitate distribution of the regeneration gas passed upwardly into the combustor. Inverted circular cup plate 52 may also be used, if desired, to aid in the distribution of the regeneration gas. Thus, the grid 50 may be used alone or in combination with plate 52.

After passing through the vessel 36, the suspension is conducted to a riser 49 where the combustion of residual carbonaceous materials on the catalyst and of carbon monoxide is further facilitated by the additional residence time provided by the riser. The riser is of such a length and cross-sectional area that the residence time of the catalyst suspension therein is at least 0.1 second (sec), preferably 1-5 sec, and most preferably 1-2 sec. After passing through the riser, the suspension passes to the conical head 46 and then into the plurality of U-shaped radiating arms 48. The suspension exits from the arms 48 and is discharged onto the top of a conical member 43. A portion of the discharged catalyst is recirculated into the spent catalyst bed 36 through the pipes 34. The pipes 34 are open at the top, and they are attached for the purpose of receiving the recycled catalyst to the conical member 43 by any convenient means, e.g., welded around the circumference thereof. The remainder of the regenerated catalyst discharged from the arms 48 is conveyed by the conduit 6 to the riser 2 of the reactor 4. In the upper portion of vessel 36, a plurality of cyclonic separator means 54 and 56 are provided for separating combustion flue gases from entrained catalyst particles. The separated flue gases pass into plenum 58 for withdrawal by conduit 60.

In one exemplary embodiment of the regenerator of FIG. 1, there are eight pipes 34, each having an inside diameter so as to allow 10:1 recirculation rates; the ratio of length of diameter of the riser 49 is about 2.0 to about 2.5; the ratio of the upper portion of the regenerator vessel to the lower portion thereof is about 1.0 to about 2.0.

Figure 3:
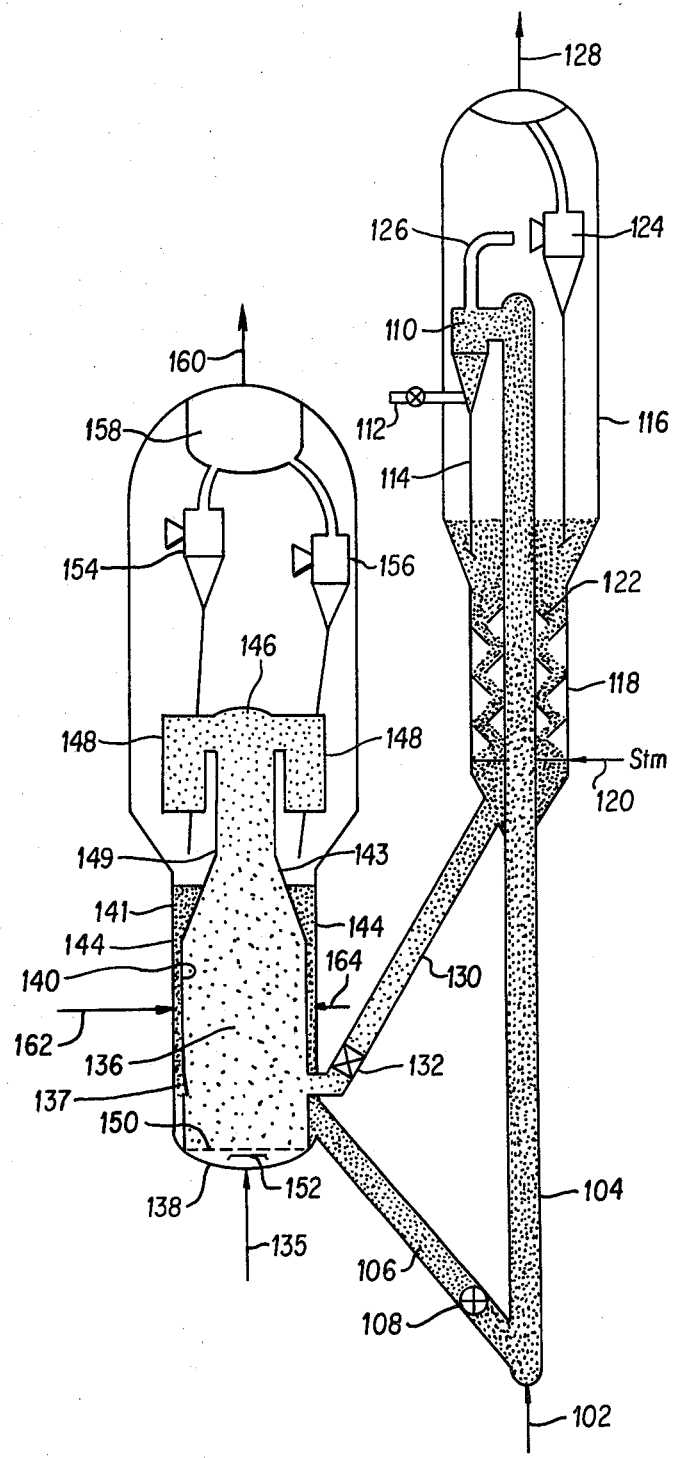
FIG. 3 is a diagrammatical sketch in elevation of an alternative embodiment of the invention using an open outer annulus, with a trickle valve means, for recycling the catalyst.

In an alternative embodiment of FIG. 3, the regenerator vessel is essentially of the same construction and design as that in FIG. 1, except that the cylindrical chamber 136 is surrounded by a concentric annulus 144 formed by the wall 140 of the combustion chamber 136 and the walls 141 of the outer regenerator shell. Thus, the annulus 144 is physically completely separated from the combustion chamber 136 by the wall 140. Communication between the cylindrical chamber 136 and the annular space 144 is provided by at least one, preferably at least two, and as many as eight or more, trickle valve means in the wall of the annular chamber. The trickle valve means 137, shown in FIG. 3, also allows for the recycle of the regenerated catalyst from the annular space 144 into the chamber 136, but do not allow spent catalyst or the regeneration gas to flow from chamber 136 into the annulus 144, similarly to the valves 37 in the embodiment of FIG. 1. The operation of the trickle valves, as in the embodiment of FIG. 1, is also controlled by the pressure exerted thereon by the mass of regenerated catalyst in the annulus 144. The embodiment of FIG. 3 is otherwise operated in a manner identical to that of FIG. 1, as described above in conjunction with the discussion thereof. Accordingly, it is believe that the operation of the apparatus of FIG.3 would be obvious to those skilled in the art from the above description of the embodiment of FIG. 1.

In FIG. 3 all of the apparatus parts are numbered in a manner similar to the corresponding parts of FIG. 1, with a prefix of 100, e.g., reactor riser 4 of FIG. 1 corresponds to the reactor riser 104 of FIG. 3, etc.

In one exemplary embodiment of FIG. 3, the annulus is sized to accommodate 10:1 recirculation rates; there are eight trickle valves 137; the ratio of length to diameter of the riser 149 is about 2.0 to about 2.5; the ratio of the upper portion of the regenerator vessel to the lower portion thereof is about 1.0 to about 2.0.

It will be obvious to those skilled in the art that the FCC process and apparatus of this invention are equipped with a number of control loops conventionally used in the FCC installations and that the operation of these conventional control loops can be integrated with each other and/or can be kept independent of each other. Such conventionally used control loops are fully disclosed in the patents and publications cited above.

Thus, for example, the embodiment of FIG. 1, discussed in detail above, includes a conventional control loop (disclosed, e.g., in U.S. Pat. No. 4,093,537, the entire contents of which are incorporated herein by reference) controlling the rate of air flow into the regenerator and the rate of transfer of regenerated catalyst into the reactor riser. The control loop includes a composition sensor 29 which indicates the carbon monoxide and oxygen content of the flue gas, and generates a signal indicative of that composition. Valve 21 is commonly controlled by operator intervention to control the flow of air and thus the CO and oxygen content of the flue gas. Alternatively, the signal generated by composition sensor 29 is transmitted to the composition controller 25. Controller 25, equipped with set points 27, places a signal on line 23, which signal is indicative of the deviation of the carbon monoxide composition of the flue gas from the set point 27 to adjust the control value 21 in a direction to reduce the deviation of the measured composition from the predetermined composition as defined by the set point 27. In general, the set point is adjusted to a CO content of less than 2000 ppm and preferably less than 50 ppm; the flue gas, in general, will contain less than 2% excess oxygen, and preferably about 0.5 to 1.0% excess oxygen. On the other hand, the rate of flow of regenerated catalyst into the reactor riser is controlled by a control loop comprised of a temperature sensing means 7 at the top of the reactor 16 and a controller 9, of a conventional type.

The regenerator apparatus above defined and shown in the drawings and explained method of operation thereof maintains during operation a substantial mass or bed of fluid regenerated catalyst particles in the annular zone. Fluidizing gas which may or may not contain oxygen is introduced to pipe means or the annulus by conduits 62 and 64.

The catalyst regeneration operation of this invention is intended to provide regenerated catalyst at an elevated temperature above 1200° F. and preferably within the range of 1250° to 1400° F. having residual coke on catalyst of less than about 0.15 and more usually within the range of 0.01 to 0.05 weight percent. The catalyst regeneration operation of this invention is accomplished by passing oxygen containing gas upwardly through a fluidized spent catalyst bed in the combustion zone. Regenerated catalyst at an elevated temperature of at least 1200° F. is recycled by the catalyst pressure head developed in the pipe means, of the preferred embodiment, or in the annulus, of the alternative embodiment, for admixture with spent catalyst passing into the combustion section. The recycle of regenerated catalyst for admixture with spent catalyst is essentially self-controlling once certain operating flow characteristics are established, such as the catalyst flow rate to the hydrocarbon conversion zone, catalyst make-up rate to the operation and the flow rate of the regenerating gas and of the suspension passing upwardly through the regenerator, and head of catalyst above bottom of standpipes 34, or above bottom of the annulus 144. Thus, the suspension of catalyst being subjected to regenerating conditions passes through gradations of catalyst particle concentration or density per given volume within the range of about 35 pounds per cubic foot to about 5 pounds per cubic foot. In the combustion section 36 (FIG. 1) or 136 (FIG. 3), it is not necessary to maintain a dense fluid bed of catalyst with a significant interface between a more dispersed phase of catalyst there-above. On the other hand, the upflowing mass of catalyst may be maintained relatively uniform in particle concentration until encountering the conical head section and radiating discharge arms which will accelerate the suspension and thus reduce the particle concentration per given volume.

The downflowing mass of regenerated catalyst collected in the annulus or in the pipes of the regenerator at an elevated temperature above 1200° F. up to about 1400° F. may be contacted with additional oxygen containing gas, should further combustion of carbon deposits be required. This downflowing mass of catalyst will normally comprise a concentration of catalyst particles in excess of 5 pounds per cubit foot and, in any event, the concentration will be sufficient to assure flow from the annulus or the pipe means into the upflowing suspension entering the combustor. Regenerated catalyst collected in the annulus or the pipes is withdrawn by standpipe 6 for passage to the riser hydrocarbon conversion zone 4.

The catalyst regeneration system of this invention contemplates providing the catalyst with a carbon monoxide oxidation promoter in an amount particularly promoting the combustion of formed carbon monoxide within the region of high particle concentration in the combustor. Catalysts particularly suitable for this purpose include chromium and platinum in selected small amounts suitable for the purpose, as well as other materials known and disclosed in the prior art. The oxidation promoter may be added as separate discrete catalyst particles or it may be added to the cracking catalyst employed in the operation. Substantially any suitable cracking catalyst may be employed in the system of this invention whether it is primarily an amorphous catalyst, a crystalline aluminosilicate catalyst or a mixture thereof. The method and apparatus of this invention is particularly suitable for using high and lower activity, relatively low coke producing crystalline zeolite cracking catalysts comprising faujasite crystalline zeolite and others known in the prior art in a regeneration arrangement particularly promoting the recovery of available heat generated by the burning of carbonaceous deposits of hydrocarbon conversion.

To evaluate technical performance characteristics of the regenerator of this invention, a computer model thereof was compared with computer models of regenerators of prior art at the same feedstock, charge rate and carbon level on regenerated catalyst. Performance characteristics of the regenerators are summarized in Table 2 below. Relative vessel dimensions are given in terms of the ratios of individual dimensions to the respective dimensions of the prior art riser regenerator.

TABLE 2

| | RISER REGENERATOR (described e.g., in U.S. Pat. Nos. 4,035,284 and 4,218,306)*** | FAST FLUIDIZED BED WITH SHORT RISER (FIGS. 1 or 3) | CONVENTIONAL** DENSE BED REGENERATOR, E.G., OF U.S. Pat. No. 3,161,583*** |
|---|---|---|---|
| RELATIVE VESSEL DIMENSIONS | | | |
| Combustor Diameter | 1.0 | 0.90 | 1.40 |
| Unit Height | 1.0 | 0.75–0.9 | 0.5–0.6 |
| Unit Surface Area | 1.0 | 1.01 | 0.55 |
| REGENERATOR PERFORMANCE | | | |
| Cat. Recycle Ratio | 3.0 | 10.0 | 0.5 |
| Av. Density, Comb., Lb/Ft$^3$ | 17.0 | 18.0 | 18.0 |
| Cat. Holdup, Comb., Tons | 38.0 | 36.0 | 80.0 |
| Total Cat. Holdup, Tons | 91.0 | 65.0 | 80.0 |
| Regenerator ΔP, PSI | (4.4/4.5)* | 6.0 | 2.8 |
| D.B. Temp., °F. | 1268 | 1270 | 1272 |
| Max. Outlet Temp., °F. | 1322 | 1316 | 1309 |
| Carbon on Regen., Wt. % | 0.067 | 0.066 | 0.067 |
| Flue Gas O$_2$, Vol. % | 1.44 | 2.10 | 2.10 |
| Gas Velocity, D.B., Ft/Sec | 6.90 | 7.20 | 3.10 |
| Gas Velocity, Riser, Ft/Sec | 35.0 | 36.5 | 3.3 |

*Two differently-sized riser regenerators, with dimensions indicated herein, were used in the computerized simulation study.
**A 50% combustion efficiency was used in calculating performance of the conventional dense bed.
***All dimensions specified in this Table were chosen arbitrarily and they do not necessarily represent any particular regenerator embodiments disclosed in the patents specified herein.

The data in Table 2 indicates that the fast fluidized bed regenerator of this invention has the same advantages as the prior art riser regenerator (U.S. Pat. No. 4,118,338) at substantially less catalyst inventory and without the cost of a slide valve. The prior art dense bed regenerator, although having less metal surface area than both the fast fluidized bed and the riser regenerator, has a higher catalyst inventory and its operation is plagued with problems due to non-uniform mixing and catalyst short-circuiting.

It will be apparent to those skilled in the art that the specific embodiments discussed above can be successfully repeated with ingredients equivalent to those generically or specifically set forth above and under variable process conditions.

From the foregoing specification one skilled in the art can readily ascertain the essential feature of this invention and without departing from the spirit and scope thereof can adopt it to various diverse applications.

What is claimed is:

1. In a fluid catalytic cracking apparatus comprising a reactor vessel and a regenerator vessel, said reactor vessel comprising a reactor riser means and a separation means for separating products of a catalytic cracking reaction from spent catalyst, said regenerator vessel comprising a bed of spent catalyst, placed substantially in the center of said regenerator vessel, and a bed of regenerated catalyst, placed substantially concentrically about said bed of spent catalyst, a means of recycling at least a portion of said regenerated catalyst from said regenerated catalyst bed to said spent catalyst bed and a regenerating medium inlet conduit cooperating with a regenerating medium distribution means in the lower section of said spent catalyst bed, the improvement wherein:
   said bed of spent catalyst is substantially completely separated from said bed of regenerated catalyst by a substantially annular wall means,
   said bed of spent catalyst further comprises a riser in the upflow section of said bed of spent catalyst
   said means of recycling at least a portion of said regenerated catalyst from said regenerated catalyst bed to said spent catalyst bed comprises at least one trickle valve means placed in said annular wall means.

2. A fluid catalytic cracking apparatus of claim 1 wherein the length of said riser in said regenerator vessel is about 1 foot to about 30 feet.

3. A fluid catalytic cracking apparatus of claim 2 wherein said length of said riser is about 15 feet to about 20 feet.

4. A fluid catalytic cracking apparatus of claim 3 wherein said means of recycling at least a portion of regenerated catalyst comprises at least two trickle valve means.

5. A fluid catalytic cracking apparatus of claim 4 wherein said means of recycling at least a portion of regenerated catalyst comprises eight trickle valve means.

6. A fluid catalytic cracking apparatus of claim 3 wherein the top of said riser is equipped with a member housing a catalyst phase of lower density than that in said bed of spent catalyst.

7. A fluid catalytic cracking apparatus of claim 6 wherein said riser is equipped with at least one radially extending inverted "U"-shaped arm means, placed on the riser below said member, said inverted "U"-shaped arm means being open on the bottom side thereof for changing the direction of flow of a suspension of said regenerating medium and said spent catalyst to promote the separation of catalyst particles from gases of the suspension.

8. A fluid catalytic cracking apparatus of claim 7 wherein said regenerating medium distribution means comprises a horizontal perforated grid means and a small circular baffle means placed in said regenerator vessel upstream of said perforated grid means.

9. A fluid catalytic cracking apparatus of claim 8 wherein said spent catalyst is initially admixed with said regenerating medium in a vertical pipe means, placed upstream of said bed of spent catalyst and in direct communication with said bed of spent catalyst, and subsequently the thus-formed suspension of said regenerating medium and said spent catalyst is conducted into said bed of spent catalyst.

* * * * *

UNITED STATES PATENT AND TRADEMARK OFFICE
CERTIFICATE OF CORRECTION

PATENT NO. : 4,448,753

DATED : May 15, 1984

INVENTOR(S) : B. GROSS, J.H. HADDAD and M. MALLADI

It is certified that error appears in the above-identified patent and that said Letters Patent are hereby corrected as shown below:

Column 8, Line 61: Before "separator" insert --a --.

Column 13, Line 27: "U.S., 4,118,338" should be --U.S. 4,218,306--.

Signed and Sealed this

Sixteenth Day of October 1984

[SEAL]

Attest:

GERALD J. MOSSINGHOFF

Attesting Officer

Commissioner of Patents and Trademarks